United States Patent

[11] 3,533,425

| [72] | Inventor | Jerry M. Hannan |
| | | 375 Miller Ave., Mill Valley, California 94941 |
| [21] | Appl. No. | 778,182 |
| [22] | Filed | Nov. 22, 1968 |
| [45] | Patented | Oct. 13, 1970 |
| | | Continuation-in-part of application Ser. No. 448,602, April 16, 1965, now Patent No. 3,417,985, Dec. 24, 1968 |

[54] AUTOMATIC ANTISWAY MECHANISM FOR VEHICLES
5 Claims, 4 Drawing Figs.

[52] U.S. Cl. .................................................. 137/46,
137/625.25, 137/627.5, 137/596, 267/11, 303/24
[51] Int. Cl. .................................................. F16k 17/36
[50] Field of Search ...................................... 137/38, 39,
45, 46, 627.5, 596, 625.25; 303/24; 267/11

[56] References Cited
UNITED STATES PATENTS

| 2,088,184 | 7/1937 | White | 137/45X |
| 2,353,503 | 7/1944 | Rost | 137/46X |
| 2,634,743 | 4/1953 | Audemar | 137/45X |
| 2,684,254 | 7/1954 | Goss | 137/45UX |
| 2,920,636 | 1/1960 | Gassner | 137/45 |
| 2,953,413 | 9/1960 | Jankauskas | 303/24 |

*Primary Examiner*—Clarence R. Gordon
*Attorney*—William R. Piper

ABSTRACT: The automatic sway mechanism can be applied to a vehicle and it will cause the vehicle body to be banked laterally in the right direction and at the proper angle when the vehicle takes a curve. This will shift the center of gravity of both the vehicle body and passengers and overcome any tendency for any lateral movement of the passengers in the vehicle. A novel pendulum actuated valve is used as a part of the mechanism and the pendulum will be actuated by centrifugal force as the vehicle makes a turn to the right or to the left from a straight course.

Patented Oct. 13, 1970

3,533,425

INVENTOR.
JERRY M. HANNAN

William R. Piper
ATTORNEY

Patented Oct. 13, 1970

INVENTOR.
JERRY M. HANNAN

William R. Piper
ATTORNEY

AUTOMATIC ANTISWAY MECHANISM FOR VEHICLES

CROSS-REFERENCE TO RELATED APPLICATION

This application is a continuation-in-part of my copending application on an automatic antisway mechanism for vehicles, Ser. No. 448,602, filed Apr. 16, 1965 now U.S. Pat. No. 3,417,985 granted Dec. 24, 1968. In that application, claims have been drawn to the antisway system. In the present case the claims are drawn to the centrifugal valve.

BACKGROUND OF THE INVENTION

1. Field of the Invention

When a vehicle is moving in a relatively straight line and then makes a turn either to the right or to the left, the passengers in the vehicle will have a tendency to move laterally in the vehicle because of the centrifugal force which tends to keep them moving along the straight line. In my antisway system, the arrangement is such that the vehicle body will be banked laterally in the right direction for the curve the vehicle is taking and the vehicle body will be banked automatically at the proper angle for the curve.

2. Description of the Prior Art

In my patent on an adjustable shock absorber and automatic control mechanism therefor, U.S. Pat. No. 3,273,876, issued Sept. 20, 1966, I disclosed a hydraulic shock absorber with an electrically controlled automatic mechanism for altering the effective lengths of the shock absorbers as the vehicle to which they were attached made a right or left hand turn.

In my copending patent application, Ser. No. 448,602, I provide an automatic mechanical control for properly banking the vehicle when making turns. The mechanical control includes the pendulum actuated valve and claims drawn to the valve are presented in the present continuation-in-part case.

SUMMARY OF THE INVENTION

An object of my invention is to provide an antisway mechanism for a vehicle that will properly and automatically bank the vehicle when it makes a turn so as to shift the center of gravity of both the vehicle body and the passengers in the vehicle so that there will be no tendency for a lateral movement of the person or persons in the vehicle. A pendulum actuated valve of novel construction forms a part of the mechanism and the pendulum will be swung by centrifugal force as the vehicle makes a turn to the right or left and will actuate the valve and cause the mechanism to bank the vehicle body in the right direction and at the proper angle during the turning of the vehicle.

DESCRIPTION OF PREFERRED EMBODIMENT

Figure 1:
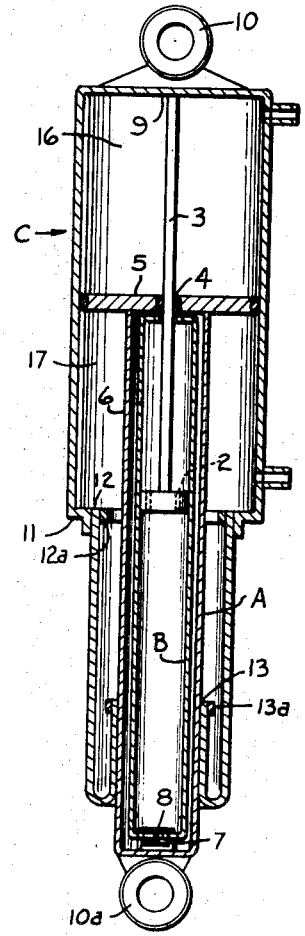
FIG. 1 is a vertical section through a hydraulic shock absorber and shows my two-way control air cylinder operatively applied thereto. The parts are shown in normal position.
Figure 2:
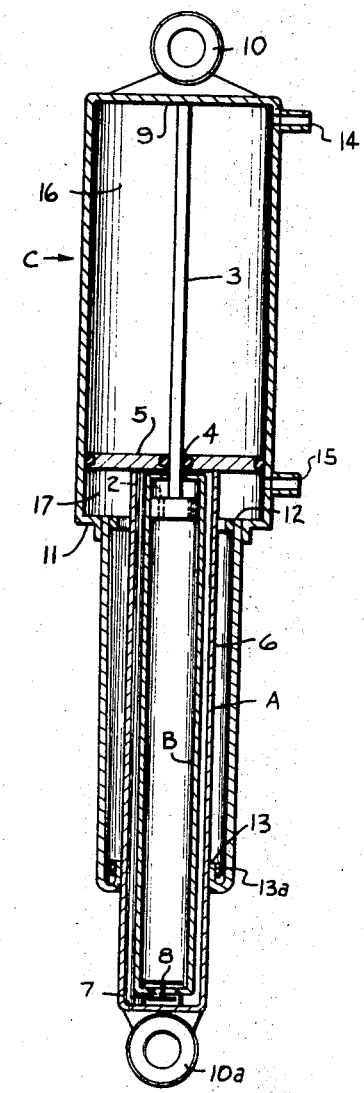
FIG. 2 is a vertical section similar to FIG. 1, but shows the air cylinder increasing the overall effective length of the hydraulic shock absorber.

In carrying out my invention, I will first describe the shock absorber shown in FIGS. 1 and 2, and then will describe the mechanism for altering the effective lengths of two or more shock absorbers that are applied to a vehicle. The shock absorber is indicated generally at A and it comprises a hydraulic cylinder B in which a piston 1 is slidably disposed. This piston has bleed openings 2 therein and a piston rod 3 extends upwardly from the piston and is slidably received in an opening 4 provided in a disc 5 that has a larger diameter than the cylinder B. The opening 4 may be provided with an oil seal so as to prevent the fluid in the cylinder B from escaping through the opening.

The hydraulic cylinder B is enclosed in an outer cylinder 6 and the disc 5 closes the top of the outer cylinder. The bottom of the hydraulic cylinder B has an opening 7 that communicates with the outer cylinder 6 so that excess oil can flow from the hydraulic cylinder B into the outer cylinder that constitutes a reserve reservoir for the fluid. A valve 8 is provided for the opening 7 and has bleed passages therein, not shown, for permitting the slow flow of excess fluid from the hydraulic cylinder B to enter the outer cylinder 6. The valve 8 is so arranged that it will permit the ready flow of fluid from the outer cylinder 6 to enter the hydraulic cylinder B when this cylinder is able to receive this additional fluid. In actual practice the outer cylinder 6 has a capacity for receiving the excess fluid from the hydraulic cylinder B that is displaced by the entrance of the piston rod 3 into the hydraulic cylinder as the piston 1 moves downwardly therein.

The hydraulic shock absorber just described is of standard construction and I apply my control mechanism to this shock absorber for changing the effective length of the shock absorber for a purpose hereinafter described.

I mount an air cylinder C around the disc 5 and the periphery of the disc can be provided with a Teflon seal for making an air-tight fit between the disc and the cylindrical wall of the air cylinder C. The piston rod 3 extends to the closed end 9 of the air cylinder and a top ring 10 is connected to the piston rod and to a part of a vehicle, not shown.

The bottom 11 of the air cylinder C has an end 12 of a tubular diaphragm D secured thereto by a ring 12a. The other end 13 of the diaphragm is folded inwardly on itself and is secured to the outer cylinder 6 by a ring 13a. The tubular diaphragm D acts as a flexible closure for the bottom of the cylinder C and will permit relative movement between the air cylinder C and the outer cylinder of the shock absorber A.

I provide an air opening 14 at the top of the air cylinder C and a second air opening 15 at the bottom of the same cylinder. If air is admitted through the top air opening 14 into an upper air compartment 16 in the air cylinder C and air is permitted to exhaust from a lower air compartment 17 in the cylinder C and pass through the air opening 15, then the disc 5 which will function as a piston and will be moved downwardly in the air cylinder C and this movement will increase the effective length of the shock absorber A, see FIG. 2. The opposite is true when air is admitted through an opening 15 into the lower compartment 17 of the air cylinder C and air is allowed to exhaust from the upper compartment 16 and flow out through the opening 14 in the cylinder C. This will move the disc 5 upwardly in the air cylinder C and will foreshorten the effective length between the rings 10 and 10a, see FIG. 1. The ring 10a is integral with the lower end of the shock absorber A, see also FIG. 2.

Before describing the entire combination of the various parts in the automatic antisway mechanism for vehicles, I will first describe a novel valve mechanism that is controlled by a pendulum and this valve mechanism will direct air under pressure to the desired shock absorber so as to alter the effective length of it. One or more shock absorbers are applied to each side of the vehicle, not shown, and when the vehicle is moving in a straight line the shock absorbers A will function in their usual manner. However, when the vehicle makes a turn to the right, for example, the shock absorbers on the right hand side of the vehicle will be foreshortened in their effective lengths while the shock absorbers on the left hand side of the vehicle will be elongated. The degree of shortening of the shock absorbers on the right hand side and the lengthening of those on the left hand side of the vehicle is determined by the speed of the vehicle as it makes a right hand turn. The opposite effect will take place when the vehicle takes a left hand turn. In this case the left hand shock absorbers will be shortened in their effective lengths and the right hand shock absorbers will be elongated in their effective lengths.

Figure 4:
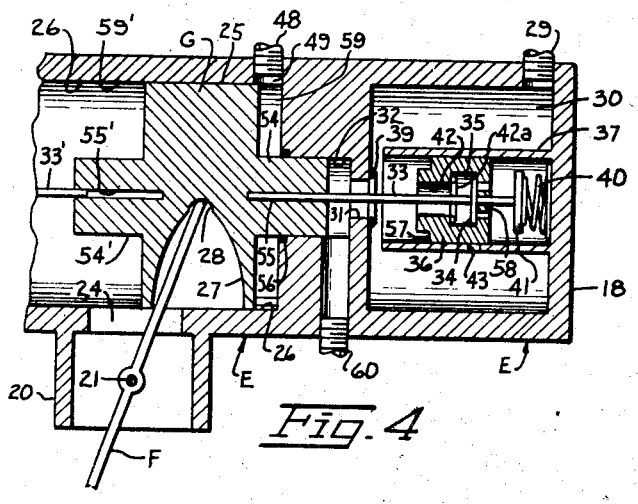
FIG. 4 shows a portion of the automatic pendulum-actuated control valve with the pendulum swung from a neutral position by centrifugal force caused by the moving vehicle making a turn.
Figure 3:
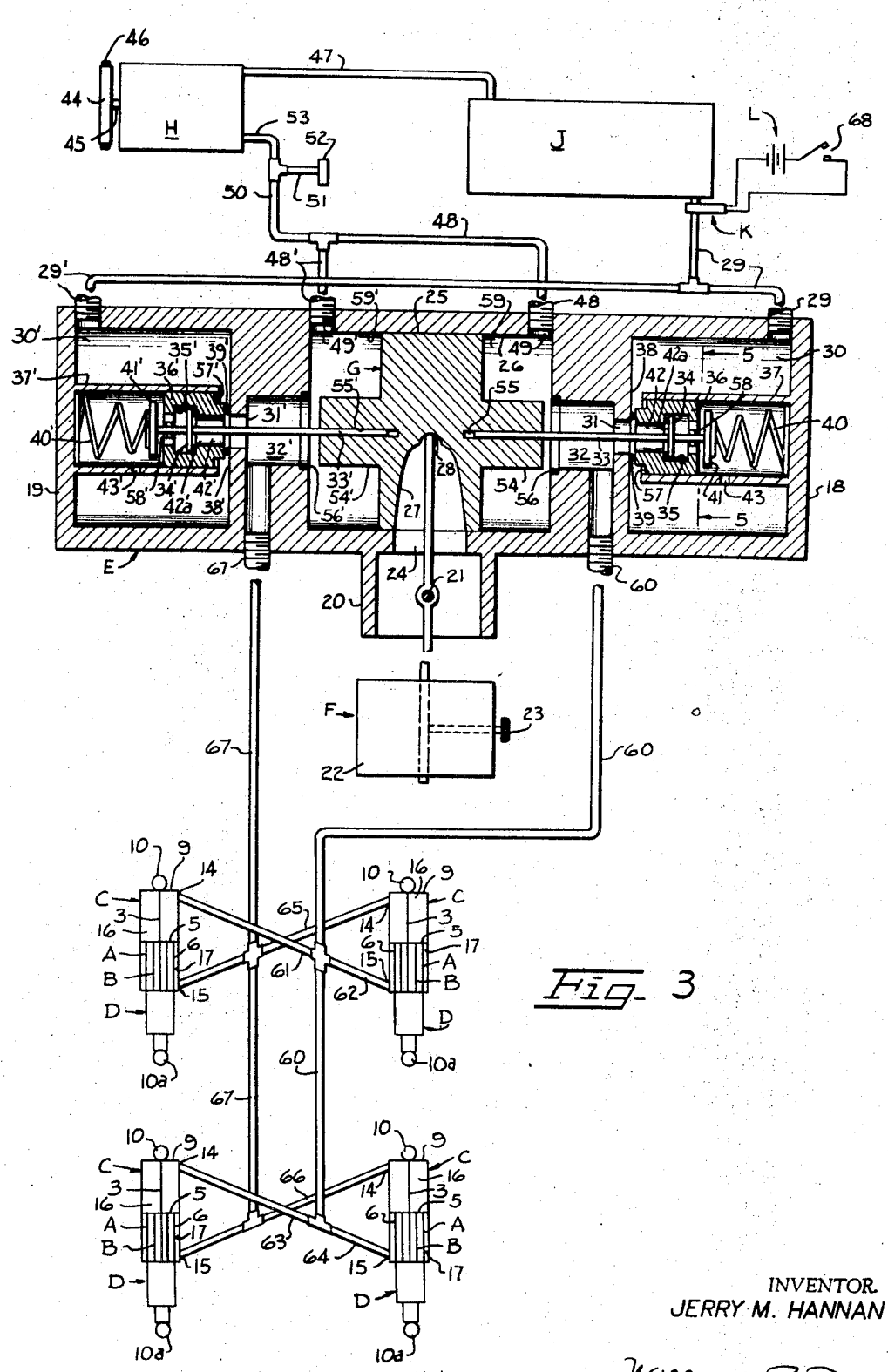
FIG. 3 is a schematic view showing a plurality of my combined hydraulic shock absorbers and two-way control air cylinders coupled to an automatic pendulum-actuated control valve for banking the vehicle body in the right direction and at the proper angle as the vehicle makes a turn to the right or to the left.

The automatic valve for controlling the flow of air to the air cylinders C for the various shock absorbers to control them in the manner just mentioned, is shown in FIGS. 3 and 4. The valve comprises an outer cylindrical casing E that is closed at both ends 18 and 19. A depending cylindrical member 20 is integral with the casing E and is disposed midway between the ends of the casing. This cylindrical member 20 has a pivot pin 21 for pivotally supporting a pendulum indicated generally at F. The pendulum carries an adjustable weight 22 and a set screw 23 may be used for securing the weight 22 at the desired height on the pendulum shank. In actual practice the ends 18 and 19 would be removable from the casing E.

The portion of the pendulum shank extending above the pivot 21 is received in a slot 24 provided in the cylindrical casing E.

The portion of the pendulum shank extending above the pivot 21 is received in a slot 24 provided in the cylindrical casing E. A centrally disposed valve-actuating member G has a cylindrical outer surface 25 that is slidably received in a cylindrical bore 26 provided in the casing E. The valve-actuating member G has a recess 27 communicating with the slot 24 in the cylindrical casing E and this recess is provided with an inner pocket 28, for receiving the upper end of the pendulum shank. It will be seen from this construction that when the pendulum F swings in a clockwise direction about its pivot 21, see FIG. 4, it will move the valve-actuating member G to the right and when the pendulum is swung in a counter-clockwise direction, the valve-actuating member G will be moved to the left in the cylinder E. The pendulum is swung by centrifugal force as the vehicle turns to the right or to the left.

The automatic valve mechanism E is preferably placed at the front of the vehicle, not shown, and the longitudinal axis of the cylindrical casing E extends transversely to the length of the vehicle so that a lateral centrifugal force will be exerted on the weight 22 for swinging the pendulum F when the vehicle to which the automatic valve is attached turns to the right or to the left. When the vehicle is turned to the right the pendulum F will move the valve-actuating member G to actuate a valving mechanism that is disposed at the right hand end of the cylindrical casing E when looking at FIGS. 3 and 4. When the vehicle makes a turn to the left the pendulum F through its valve-actuating member G will actuate a similar valving mechanism at the left hand end of the cylindrical casing B. Therefore a description of the valving mechanism shown at the right hand end of the cylinder E will suffice for both mechisms and similar parts in the valving mechanism disposed at the left hand end of the cylinder E will have the reference numerals primed.

A compressed air inlet pipe 29, see FIG. 3, communicates with a high pressure compartment 30 which is formed by the end 18 of the cylindrical casing E and by the adjacent cylindrical wall of the casing. The left hand end of the high pressure compartment 30 has a central opening 31 through which the compressed air in the compartment 30 can pass into an inner intermediate high pressure cylinder 32 when the central opening 31 is uncovered. A piston rod 33 extends through the opening 31 and the diameter of the rod is less than that of the opening so that air under pressure can pass through the opening when it is uncovered. The piston rod 33 actuates a pilot valve which comprises a valve disc 34 mounted on the piston rod and this disc is received in a compartment 35 formed in a pilot piston 36 that is slidably received in a control cylinder 37. The control cylinder 37 is axially aligned with the cylindrical casing E and has one end closed by the end 18 for the casing E and has its inner end spaced from the partition 38 in which the central opening 31 is provided.

The right hand side of the opening 31 in FIG. 3, has a valve seat 39 and the left hand end of the piston 36 is normally held against the seat 39 for closing the opening 31. This is accomplished by means of a coil spring 40 that is disposed in the control cylinder 37 and this coil spring bears against the end 18 of the cylindrical casing E and also against a head 41 that is mounted on the right hand end of the piston rod 33. The spring 40 urges the head 41 to the left in FIG. 3 and this will move the valve disc 34, mounted on the piston rod 33, to the left for causing the valve to close a central opening 42 in the piston 36. Also the disc 34 will hold the piston 36 against the valve seat 39 for closing the opening 31. Therefore the compressed air entering the pipe 29 will fill the high pressure compartment 30 with compressed air and will also flow into the control cylinder 37 through a bleed orifice 43 in the cylinder so that the air pressure within the control cylinder will eventually equal the air pressure in the compartment 30.

Before describing how the piston 36 operates to open the central orifice 31, it is best to set forth the source of compressed air pressure for the pipe 29. In FIG. 3, I show an air compressor diagrammatically at H. This air compressor is of standard construction and is operated by a pulley 44 that is mounted on the air compressor shaft 45 and is rotated by a belt 46 when the engine of the vehicle, not shown, operates. An air pipe 47 leads from the air cylinder H to a high pressure air tank J. The high pressure air pipe 29 leads from the bottom of the air tank J to the right hand end of the cylindrical casing E and communicates with the compartment 30. A branch pipe 29' leads from the air pipe 29 and it communicates with the high pressure compartment 30' disposed at the other end 19 of the cylindrical casing E.

A pair of exhaust pipes 48 and 48' lead from exhaust ports 49 and 49' to a common exhaust pipe 50 and this has a branch pipe 51 communicating with the atmosphere through an air filter 52. The pipe 50 itself extends back to the inlet of the air compressor H through a section 53. By this arrangement if the air compressor H needs atmospheric air it will draw this air through the air filter 52, the branch pipe 51 and the pipe section 53. Also the exhaust air flowing through the pipe 50 in a manner hereinafter described will feed back to the air compressor H if it is needed or it will exhaust to the atmosphere through the pipe section 51.

In this arrangement of parts it will be seen that as soon as the engine of the vehicle is started operating, the air compressor H will deliver compressed air to the tank J and the air compressor can be set for continuing to deliver air to the tank until the pressure in the tank equals one hundred and twenty-five pounds per square inch for example, or any other pressure desired. The pipe 29 will therefore convey air at this pressure from the tank J to the compartments 30 and 30' in the cylindrical casing E and the device will be ready to operate as soon as the vehicle turns to the right or to the left and causes the pendulum F to swing about its pivot 21 due to centrifugal force.

Assume that the vehicle is making a right hand turn so as to swing the pendulum F clockwise about its pivot and to move the valve actuating member G to the right in FIG. 4. The central member G has an extension 54 at its right hand end and this extension has a central bore 55 for slidably receiving the left hand end of the piston rod 33. When the piston rod is in normal position, its left hand end will be spaced from the bottom of the bore 55 so there will be a lost motion of the actuating member G before the bottom of the bore 55 contacts with the piston rod 33. During this movement of the central member G, the cylindrical extension 54 will enter the intermediate cylinder 32 to close it. The open end of the cylinder 32 has an annular seal 56 that is contacted by the right hand end of the cylindrical extension 54 for closing the intermediate cylinder before the piston rod 33 is actuated for initially opening the valve disc 34.

As soon as the piston rod 33 opens the disc valve 34, the compressed air in the control cylinder 37 will immediately exhaust through the central opening 42 and pass on through the central opening 31 in the partition 38. The compressed air in the high pressure compartment 30 will not be able to enter the control cylinder 37 through the bleed hole 43 fast enough to equalize the air pressure in the control cylinder 37 with that in the high pressure compartment 30. The result will be that the air pressure in the control cylinder 37 will be less than that in the high pressure compartment 30 for a short time and this will cause the high pressure air in the compartment 30 to react against an annular shoulder 57 on the piston 36 to move the piston into the control cylinder 37 for clearing the valve seat 39 and permitting air to flow from the high pressure compartment 30 through the central opening 31 and into the intermediate cylinder 32 that is now closed by the cylindrical extension 54, see FIG. 4.

The piston 36 will remain unseated from the valve seat 39 so long as the vehicle is making a turn and there is sufficient centrifugal force to continue to hold the weight 22 to the left of the position shown in FIG. 3, and to maintain the valve actuating member G in a position where the cylindrical portion 54 will keep the intermediate cylinder 32 closed as shown in FIG. 4. The disc valve 34 will strike against a spider 58 that is formed at the right hand end of the piston 36, see FIGS. 4 and 5. The movement of the valve actuating member G by the pendulum F to the right in FIG. 4, will cause the piston rod 33 to be moved to the right and bring the disc valve 34 into contact with the spider 58 for holding the piston 36 in open position until the valve actuating member G returns to normal position. The spider 38 can act as a centering bearing for the piston rod 33 and it will permit compressed air to flow into the compartment 35 in the piston 36 even though the disc valve 34 continues to contact with the inner surface of the spider.

Before describing the operation of the entire mechanism, it is best to state that after the vehicle has completed its turn and now continues in a straight forward direction, the weight 22 will return the pendulum F to neutral position and the pendulum in turn will move the valve-actuating member G back to neutral position. This will cause the cylindrical portion 54 of the valve-actuating member G to open the inner end of the intermediate cylinder 32 and any compressed air in the cylinder will escape into an air outlet compartment 59 and this air can escape through the exhaust pipe 48 that communicates with this compartment and either flow out through the exhaust pipe 51 to the atmosphere or be returned to the air compresser H by means of the pipe section 53. The coil spring 40 is now free to move the piston rod head 41 to the left in FIG. 4, and to move the piston rod 33 in the same direction so that the latter can move the disc valve 34 against its valve seat 42a for closing the central opening 42 in the piston 36 and for moving the piston to the left for closing the valve seat 39 in order to close the central opening 31. The valve mechanism is now ready for the next operation which will be caused by the swinging of the pendulum F when the vehicle negotiates the next turn in the road.

There is a novel construction in the mechanism just described which will cause compressed air to feed into the intermediate cylinder 32 so long as the pendulum F is swung by centrifugal force for moving the piston 36 into the control cylinder 37 for uncovering the central opening 31 and for keeping this opening uncovered. Should the curve in the road be less pronounced for a portion of its length, the weight 22 will start to return the pendulum F toward neutral position and as soon as the cylindrical portion 54 of the valve-actuating member G is moved by the pendulum so as to open the intermediate cylinder 32, the compressed air in the cylinder will feed into the air outlet compartment 59 rather than be conveyed to the shock absorbers in a manner hereinafter described. Of course the compressed air in the compartment 59 will then immediately flow into the exhaust pipe 48 and this will stop any further flow of compressed air from the intermediate cylinder 32 and into a conduit 60 that leads from the intermediate cylinder to the air compartment in the shock absorbers A.

If now the curve in the road should suddenly grow sharper, the weight 22 will again be moved to the left in FIG. 3, and will swing the pendulum F in a clockwise direction for moving the valve-actuating member G and causing the cylindrical portion 54 to again close the intermediate cylinder 32. The valving mechanism will operate in the manner already described and compressed air will flow from the pipe 29 through the mechanism and into the conduit 60.

It will also be seen that the device will bank the vehicle body to a greater extent for a sharper curve because the weight 22 will be moved further to the left in FIG. 4, and the valve-actuating member G and the cylindrical operation 54 will be moved to the right for keeping the intermediate cylinder 32 closed for a longer length of time. During this time interval the compressed air from the pipe 29 will continue to flow in the conduit 60 and on into the air compartments for the shock absorbers for causing the left hand set of shock absorbers shown diagrammatically in FIG. 3, to be elongated to a greater extent and at the same time to cause the right hand group of shock absorbers to be reduced in their effective lengths. This will result in a steeper banking of the vehicle.

I have described the particular valve mechanism which will be actuated when the vehicle makes a right hand turn and the weight 22 is swung to the left as in FIG. 4. The opposite end of the cylindrical casing E will house a similar valve mechanism and when the vehicle makes a turn to the left, the weight 22 will be swung to the right with the result that the valve-actuating member G will be moved to the left and will actuate the left hand valve-actuating mechanism in the same manner as already described for the valve mechanism for the right hand end of the casing E.

FIG. 3 shows the conduit 60 communicating with a branch pipe 61 that in turn communicates through the opening 14 with the upper compartment 16 of the air cylinder C for the left hand shock absorber A. The air entering the compartment 16 will lengthen the effective length of the shock absorber A, associated with this air compartment. The conduit 60 will also communicate with a second branch pipe 62 and this leads to the lower air compartment 17 by means of the opening 15 for enlarging this air compartment in the air cylinder C of the right hand side shock absorber A for decreasing the effective length of this shock absorber. These two shock absorbers will bank the vehicle body at a proper angle while the vehicle is making a right turn in the road.

If another pair of shock absorbers are used on the same vehicle as shown in FIG. 3, the conduit 60 will communicate with a second branch pipe 63 and this pipe will communicate with the upper air compartment 16 of the second left hand shock absorber A which will enlarge this compartment and will increase the effective length of the shock absorber in the same manner as already mentioned for the other shock absorber disposed on the left hand side of the vehicle. Furthermore the connection of the conduit 60 to another branch pipe 64 will convey compressed air to the lower air compartment 17 in the other right hand shock absorber A and this will shorten the effective length of this shock absorber in a manner already described.

It will further be seen from FIG. 3, that the upper air compartments 16 of the right hand shock absorbers A will be connected by conduits 65 and 66 to the lower compartments 17 of the left hand shock absorbers A. Both of the conduits 65 and 66 communicate with a conduit 67 that leads back to the intermediate cylinder 32' in the left hand end of the casing E. When the vehicle is making a right hand turn the pendulum F will hold the valve actuating member G to the right in FIG. 4, so as to keep the cylindrical portion 54' clear of the intermediate cylinder 32'. Therefore the air that is compressed in the lower air compartments 17 in the left hand shock absorbers A will exhaust through the conduits 65 and 66 and then enter the conduit 67 where the air will flow into the intermediate cylinder 32' and into the air outlet compartment 59'. From here the exhaust air will flow into the exhaust pipe 48' and then vent to the atmosphere through the pipe section 51.

When the vehicle makes a left hand turn the conduit 67 becomes a means for conveying compressed air to the upper air compartments 16 in the right hand shock absorbers A through the branch conduits 65 and 66 for elongating the effective lengths of the shock absorbers. At the same time compressed air will be admitted to the lower compartments 17 in the left hand shock absorbers A by means of the branch conduits 65 and 66 for decreasing their effective lengths. The exhaust air from the lower compartments 17 in the right hand shock absorbers A and from the upper compartment 16 in the left hand shock absorbers A will flow through the branch pipes 61 to 64 inclusive to the conduit 60 which will convey the exhaust air back to the intermediate cylinder 32. This cylinder will be opened to the air outlet compartment 59 because the cylindrical portion 54 of the valve-actuating member G has moved to the left in FIG. 3. The exhaust air will then flow through the exhaust pipe 48 to the branch pipe 51 and escape to the atmosphere.

It will be seen from this construction that the device will automatically bank the vehicle at the proper angle when the vehicle makes a turn and this angle will be automatically increased if the speed of the vehicle is increased or the turn becomes more sharp. When the vehicle is moving in a straight forward direction, the pendulum F will be in neutral position and then the shock absorbers A will function in their ordinary manner.

It is possible for the driver to make the device inoperative should he not wish to use it while driving the vehicle. I provide a solenoid actuated valve indicated generally at K and mount this valve in the line 29 that leads from the high pressure air tank J, see FIG. 3. When the solenoid of this valve is deenergized, the valve will close and will stop the flow of compressed air through the pipe 29. Therefore the valving mechanism shown in the casing E will have no effect even though the pendulum F will actuate it during the movement of the vehicle around curves. This is true because the compressed air is not being fed through the valving mechanism.

When the driver wishes to have the device function, he closes an electric switch 68, see FIG. 3, and this will close an electric circuit from the battery L of the vehicle to the solenoid in the solenoid valve K. The solenoid will be energized and will open the valve so that air can flow through the pipe 29 from the high pressure air tank J to the valve mechanism in the casing E in the manner already described.

It is possible to omit the lower air compartment 17 in each air cylinder C and use only the upper air compartment 16 for elongating the effective length of the shock absorber and to make use of gravity for shortening the effective length. For example in FIGS. 1 and 2, the lower air compartment 17 could be omitted and air entering the upper air compartment 16 would elongate the effective length of the shock absorber by moving the disc 5 toward the lower end of the air cylinder C. If the vehicle, not shown, were turning to the right, the left hand shock absorbers A, shown in FIG. 3, would have their effective lengths elongated by admitting air to the upper compartments 16, and the effective lengths of the right hand shock absorbers A, would be shortened by permitting air to exhaust from the upper compartments 16 as gravity causes the weight of the vehicle to press down upon the ring 10, to move the ring and cylinder end 9 toward the disc 5.

The shock absorbers A with single air compartments 16, could be actuated by the valve control mechanism E in the same manner as illustrated and described in FIGS. 3 and 4. The only change would be the elimination of the lower air compartments 17 and the air conduits communicating with them. Therefore further description of this feature need not be given.

I claim:

1. In a device of the type described:
   a. a valve casing having a high pressure compartment therein;
   b. a source of compressed air and a pipe leading therefrom to said compartment;
   c. an air exhaust compartment having an air exhaust pipe communicating therewith;
   d. an intermediate cylinder having one end normally open to said exhaust compartment and having its other end provided with a passage communicating with said high pressure compartment; a pipe leading from said intermediate cylinder;
   e. a high pressure cylinder disposed within said high pressure compartment and having an open end communicating with said high pressure compartment and having a bleed opening placing the interior of said high pressure cylinder in communication with said high pressure compartment;
   f. a pilot piston mounted in said high pressure cylinder and normally closing the passage leading to said intermediate cylinder; said pilot piston having a valve-controlled chamber therein communicating with said passage leading to said intermediate cylinder when said pilot piston closes the passage to said intermediate cylinder, said valve-controlled chamber receiving air from said high pressure cylinder;
   g. a pendulum-actuated member slidable in said valve casing and having a central bore of a predetermined length and a cylindrical portion for closing the open end of said intermediate cylinder when said member is moved by the swinging of the pendulum;
   h. a piston rod slidably received in said bore and having an end entering said pilot piston chamber provided with a valve body that normally closes said chamber passage;
   i. said pendulum-actuated member when moved by the pendulum having its cylindrical portion initially closing the open end of said intermediate cylinder, a further movement of said member moving said piston rod and the valve body on said rod for opening the passage communicating with said chamber;
   j. whereby air under pressure will flow from said high pressure cylinder through said chamber and chamber passage into said intermediate cylinder for reducing the pressure in said high pressure cylinder so that the air pressure in said high pressure compartment can move said pilot piston for opening the passage between said intermediate cylinder and said high pressure compartment for permitting air to flow from said high pressure compartment into said intermediate cylinder and out through said pipe communicating therewith.

2. The combination as set forth in claim 1: and in which when the pendulum returns to normal position it will move said pendulum-actuated member to have its cylindrical portion open said intermediate cylinder and open communication between the pipe that connects with said intermediate cylinder and said pipe that connects with said exhaust compartment.

3. The combination as set forth in claim 1: and in which yielding means is provided in said high pressure cylinder for urging said pilot piston to close the passage between said high pressure compartment and said intermediate cylinder when the cylindrical portion of said pendulum-actuated member moves to open communication between said intermediate cylinder and said exhaust compartment.

4. A valve casing having
   a. a high pressure compartment in communication with a source of compressed air;
   b. an air exhaust compartment;
   c. an intermediate cylinder having one end normally open to said exhaust compartment and having its other end communicating with said high pressure compartment; a pipe leading from said intermediate cylinder; and
   d. a pendulum-actuated member having a cylindrical portion for closing the open end of said intermediate cylinder when the pendulum moves said member in one direction;
   e. whereby communication is cut off between said intermediate cylinder and said exhaust compartment and air can flow from said high pressure compartment and out through the pipe communicating with said intermediate cylinder.

5. A valve of the type set forth in claim 4, and in which
   a. a second high pressure compartment is in communication with a source of compressed air;

b. a second air exhaust compartment;
c. a second intermediate cylinder having one end normally open to said second exhaust compartment and having its other end communicating with said second high pressure compartment; a second pipe leading from said second intermediate cylinder;
d. said pendulum-actuated member having a second cylindrical portion for closing the open end of said second intermediate cylinder when the pendulum moves said member in another direction;
e. whereby communication is cut off between said second intermediate cylinder and said second exhaust compartment and air can flow from said second high pressure compartment and out through said second pipe communicating with said second intermediate cylinder.